C. W. HUTCHINSON.
TRACTION ATTACHMENT FOR MOTOR VEHICLES.
APPLICATION FILED AUG. 5, 1918.
1,319,221.
Patented Oct. 21, 1919
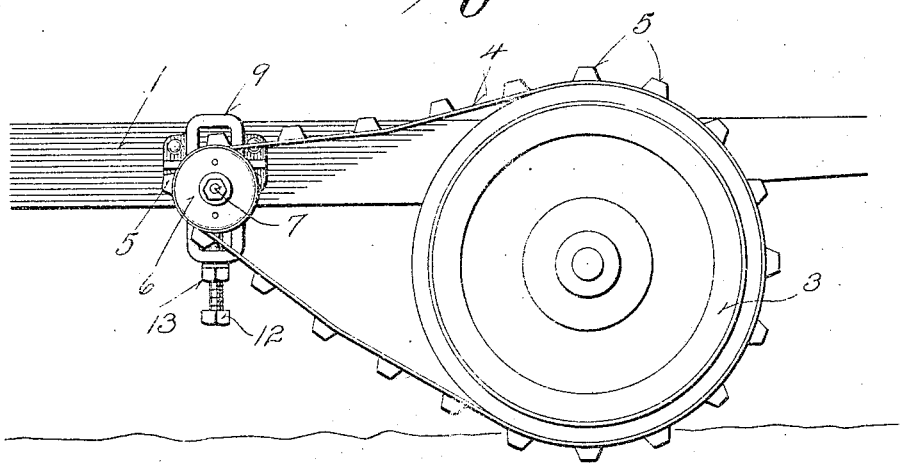
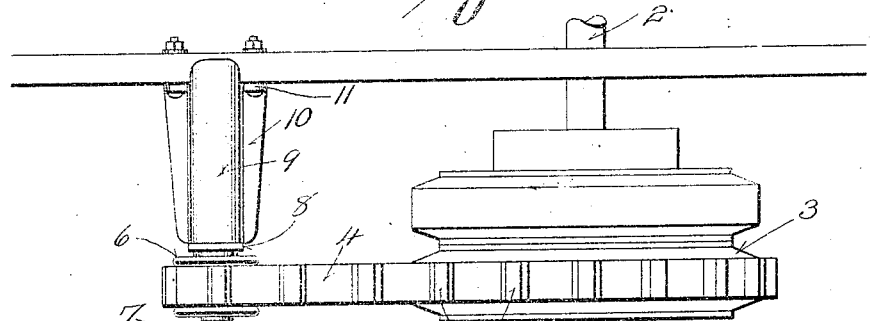
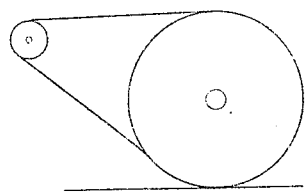
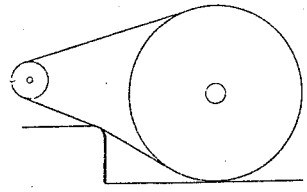
WITNESS:
INVENTOR
Charles W. Hutchinson
BY
ATTORNEY

UNITED STATES PATENT OFFICE.

CHARLES W. HUTCHINSON, OF MILWAUKEE, WISCONSIN.

TRACTION ATTACHMENT FOR MOTOR-VEHICLES.

1,319,221.  Specification of Letters Patent.  Patented Oct. 21, 1919.

Application filed August 5, 1918. Serial No. 248,416.

*To all whom it may concern:*

Be it known that I, CHARLES W. HUTCHINSON, a citizen of the United States, and resident of Milwaukee, in the county of Milwaukee and State of Wisconsin, have invented certain new and useful Improvements in Traction Attachments for Motor-Vehicles; and I do hereby declare that the following is a full, clear, and exact description thereof.

My invention consists in improvements in self-propelled vehicles, and particularly in traction means therefor.

It is the trend in the present manufacture of motor vehicles, particularly heavy trucks and the like, to provide the same with as great a traction surface as is possible consistent with the size and power of the vehicle. This is ordinarily obtained by increasing the diameter and width of the driving wheels, or by a caterpillar drive. Both of these arrangements are comparatively expensive and for this reason are used practically only on vehicles for special purposes.

The object of the present invention is to provide an arrangement for economically increasing the traction means of all sizes of power driven vehicles including both those for light as well as for heavy duty.

It is also an object of the invention to provide means for adjustably increasing or decreasing the traction of a motor driven vehicle.

With these and other objects and advantages in view the invention resides in novel features of construction, combination and arrangement of parts which will be hereinafter particularly described and claimed.

In the accompanying drawings:—

Figure 1 represents a side elevational view of the rear end of a motor driven vehicle illustrating my invention applied to one of the driving wheels.

Fig. 2 is a plan view of the parts shown in Fig. 1, and

Figs. 3 and 4 are diagrammatic views depicting certain operations of the invention.

Inasmuch as the invention may be used on any type of vehicle driven by any usual power means, only so much of a machine of this nature has been shown as to conveniently illustrate one of the embodiments of the improvement. This conventional motor vehicle includes a frame formed from angle metal side bars 1, a rear axle structure 2 suspended from the frame, and driving wheels 3 mounted upon said axle.

The invention consists in disposing a flexible drive member 4 around the periphery of each driving wheel 3, said members being either in the form of endless bands of leather, fabric or flexible metal, or of chain. In the drawing a band is shown on which is mounted a plurality of traction lugs 5.

The band or flexible drive member 4 is of a length considerably greater than the length of the periphery of the driving wheel on which it is mounted and is projected forwardly thereof. In this manner the lower stretch of the drive member in advance of the wheel 3 will engage the road surface, especially where the same is broken or uneven, before the portion thereof which is in contact with the periphery of the wheel.

This forwardly extending portion of the flexible drive member is trained around a pulley 6 journally mounted on the end of a stub shaft 7 which projects outwardly from a journal block 8. This block is vertically slidably mounted in a housing 9; said housing is horizontally and longitudinally ribbed as at 10 and its inner end is provided with lateral flanges 11 whereby the same may be attached to one of the side bars 1.

The journal block 8 is moved vertically within the housing upon rotation of a set screw 12, the latter being threaded through the bottom of the housing into engagement with said block. A lock nut is used for holding the same in adjusted positions.

One of the flexible drive members 4 is preferably used on each driving wheel, although it is of course possible that under certain circumstances it might be necessary to so equip only one of the driving wheels. By adjusting the journal block 8 within its housing 9 the lower stretch of the flexible drive member, which is disposed around the pulley supported on said block, will be raised or lowered with respect to the road surface. When in lowered position the traction lugs of this lower stretch will obviously grip the road surface or the snow or ice thereon before the main gripping action of those lugs which are immediately adjacent the periphery of the wheel 3 is exerted. In view of this it is unnecessary to provide any tightening arrangement for the flexible drive member when the pulley 6 is in its lowermost position. In other words the engagement of the lower stretch of the flexible drive member as shown in Fig. 4 will prevent the same from slipping relative to the wheel 3 and will cause a uniform rotation or movement thereof. A comparison of Figs. 3 and 4 will illustrate this point, Fig. 3 showing the fact that the flexible drive member is relatively tight when in elevated position.

Under certain conditions it may be desirable that the entire traction device above particularly described be dispensed with, for instance where the vehicle is to be driven over city streets or other smooth road surfaces. This may be readily accomplished by moving the flexible drive member laterally or transversely of the drive wheel and the pulley 6, the latter being mounted on the free end of a stub shaft to readily permit such removal. It will also be evident that the flexible drive member may be arranged in operative position with equal facility.

I claim:—

The combination with a self-propelled vehicle including a supporting frame and a drive wheel carried by the frame, of a bracket on the frame forwardly of the drive wheel, a stub shaft adjustably connected to the bracket at one end, said stub shaft having vertical movement with respect to the bracket and said drive wheel, a pulley wheel revolubly mounted on the free end of said stub shaft, the peripheral face of said pulley wheel being transversely flat, a normally transversely flat endless flexible drive member of greater length than the length of the periphery of said drive wheel and disposed therearound and around said pulley wheel, said drive member being movable laterally or transversely of the pulley wheel and the drive wheel to completely remove the former from the wheels, and means for moving the stub shaft and the pulley wheel carried thereby vertically to vary the tension on said drive member.

In testimony that I claim the foregoing I have hereunto set my hand at Milwaukee, in the county of Milwaukee and State of Wisconsin.

CHARLES W. HUTCHINSON.